United States Patent [19]

Buschbom

[11] Patent Number: 5,190,140
[45] Date of Patent: * Mar. 2, 1993

[54] MATERIAL HANDLING APPARATUS

[75] Inventor: Floyd E. Buschbom, Long Lake, Minn.

[73] Assignee: J-Star Industries, Fort Atkinson, Wis.

[*] Notice: The portion of the term of this patent subsequent to Oct. 23, 2007 has been disclaimed.

[21] Appl. No.: 842,535

[22] Filed: Feb. 27, 1992

Related U.S. Application Data

[60] Division of Ser. No. 735,634, Jul. 25, 1991, Pat. No. 5,147,030, which is a continuation-in-part of Ser. No. 542,538, Jun. 25, 1990, Pat. No. 5,035,317, which is a division of Ser. No. 388,140, Aug. 1, 1989, Pat. No. 4,964,502.

[51] Int. Cl.$^5$ ............................................. B65G 31/04
[52] U.S. Cl. ................................... 198/642; 414/319; 37/251; 37/255; 406/57; 406/97; 406/100
[58] Field of Search ............... 198/640, 642; 414/313, 414/319, 320; 406/57–59, 71, 97, 100; 37/251, 254–256, 259

[56] References Cited

U.S. PATENT DOCUMENTS

| | | |
|---|---|---|
| 2,630,351 | 3/1953 | Hansen . |
| 2,632,399 | 3/1953 | Hyre . |
| 2,712,412 | 7/1955 | West . |
| 2,877,907 | 3/1959 | Buschbom . |
| 2,944,308 | 7/1960 | Beech . |
| 3,221,904 | 12/1965 | Buschbom . |
| 3,316,025 | 4/1967 | Sullivan et al. . |
| 3,367,521 | 2/1968 | Seymour et al. . |
| 3,370,721 | 2/1968 | Seymour et al. . |
| 3,371,434 | 3/1968 | Wandscheer . |
| 3,539,059 | 11/1970 | Buschbom . |
| 3,589,500 | 6/1971 | Hansen . |
| 3,651,910 | 3/1972 | Buschbom . |
| 4,158,923 | 6/1979 | Steiner et al. . |
| 4,203,237 | 5/1980 | Enters et al. . |
| 4,329,792 | 5/1982 | Berner . |
| 4,425,058 | 1/1984 | Sorensen et al. . |
| 4,595,318 | 6/1986 | Viesselmann . |
| 4,696,432 | 9/1987 | Russ et al. . |
| 4,964,502 | 10/1990 | Buschbom ............... 198/642 |
| 5,035,317 | 7/1991 | Buschbom ............... 198/642 |

FOREIGN PATENT DOCUMENTS 466100  6/1950  Canada .

Primary Examiner—Joseph E. Valenza
Attorney, Agent, or Firm—Burd, Bartz & Gutenkauf

[57] ABSTRACT

An impeller assembly having a housing supporting a rotatable impeller. The housing has a bottom entrance opening and a top exit opening separated by a curved back wall. A liner of low friction and abrasion resistant plastic material located adjacent a portion of the inside of the back wall prevents material buildup on the back wall. The liner is removeably mounted on the housing so that it can be replaced without taking the housing apart. The impeller has a plurality of pivoted paddle assemblies. Each paddle assembly has a body carrying a generally U-shaped liner of low friction and abrasion resistant material to minimize the collection of material on the paddle assemblies. The housing includes a knife adjacent the entrance opening. The body of the impeller assembly has a transverse lip that moves in close relation relative to the knife to cut material.

17 Claims, 7 Drawing Sheets

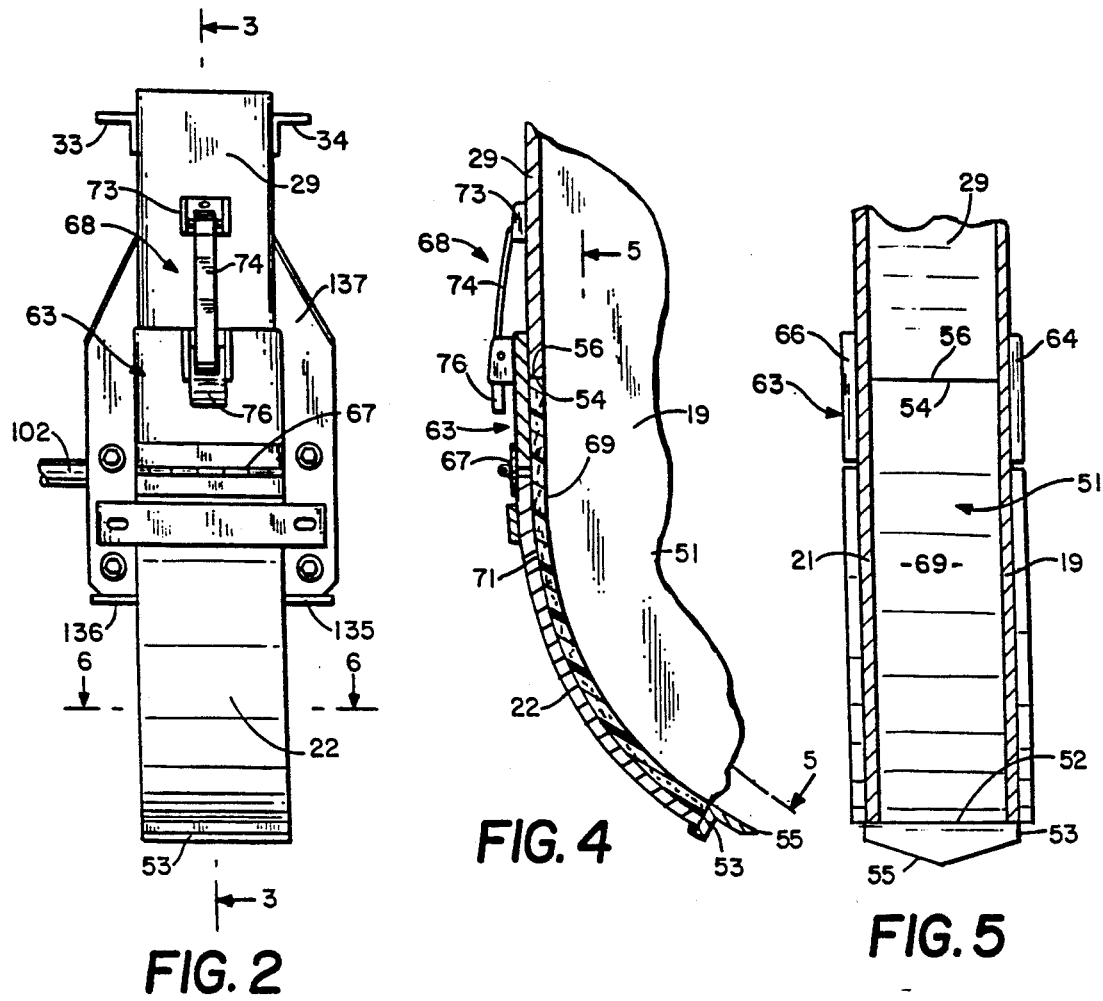
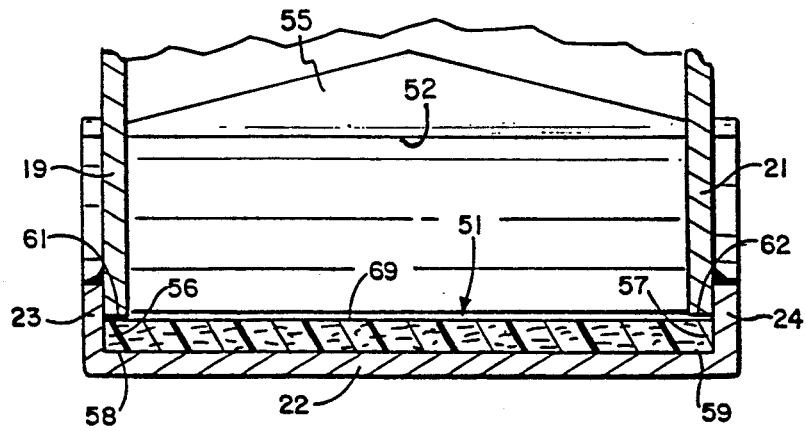

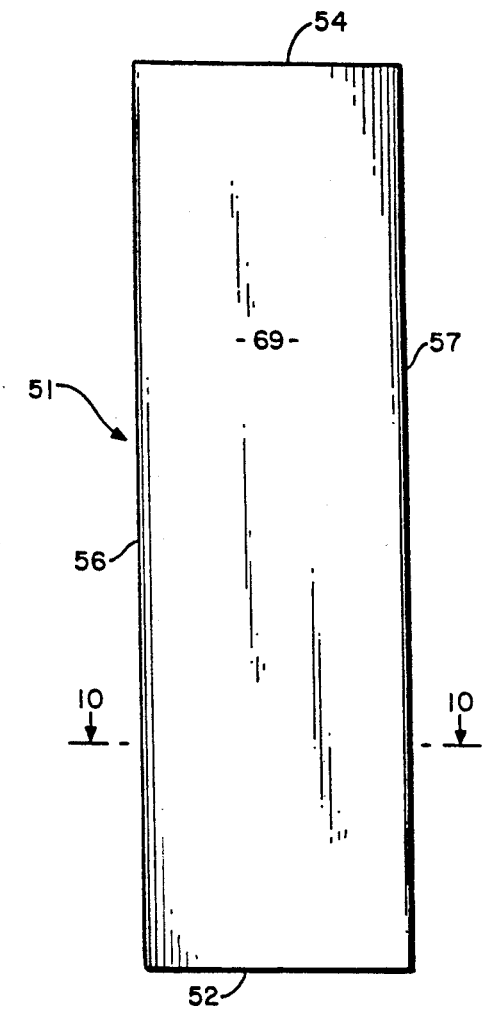
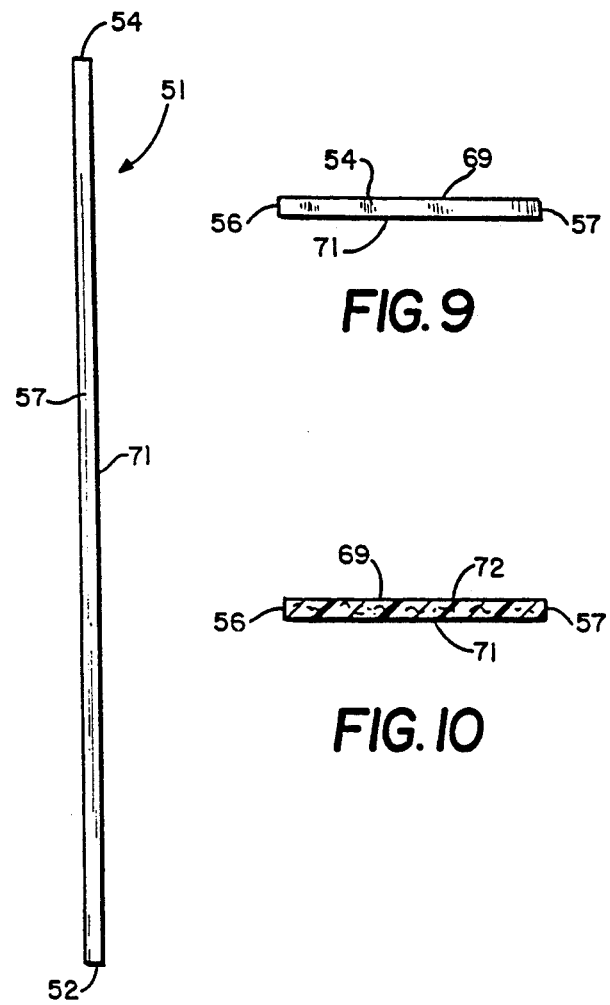
FIG. 7    FIG. 8    FIG. 9    FIG. 10

MATERIAL HANDLING APPARATUS

CROSS REFERENCE TO RELATED APPLICATION

This application is a division of U.S. patent application Ser. No. 735,634 filed Jul. 25, 1991, now U.S. Pat. No. 5,147,030. Application Ser. No. 735,634 is a continuation-in-part of U.S. application Ser. No. 542,538 filed Jun. 25, 1990, now U.S. Pat. No. 5,035,317. U.S. application Ser. No. 542,538 is a division of U.S. application Ser. No. 388,140 filed Aug. 1, 1989 now U.S. Pat. No. 4,964,502.

TECHNICAL FIELD

The invention relates to impellers for use with material handling machines, such as silo unloaders, material blowers, crop cutting machines, lawn mowers, scattering unloaders, and beet toppers to pick up and convey particulate materials to a selected location. The impellers have rotating discs carrying pivoting paddles located within housings for throwing particulate material out of the housings into material discharge chutes. Impellers of this type are used in top unloading silo unloaders.

BACKGROUND OF INVENTION

Material throwing impellers having pivoting paddles are used in silo unloaders to pick up silage and haylage and throw these materials into tower silo chutes. An example of an impeller for a silo unloader having pivoted paddles is shown by Hansen in U.S. Pat. No. 3,589,500. The paddles have generally V-shaped metal bodies pivotally connected to a rotor mounted on a drive shaft. The shaft is rotatably mounted on a housing having a bottom entrance opening and a top exit opening. The paddles move in close relationship to a sheet metal back wall leading upwardly to the exit opening. The paddles as they pick up the material impact material on the lower entrance plate and back wall and other inside surfaces of the housing. The material being wet has gum and strong adhesive characteristics which causes the material to collect on the walls of the housing. The buildup of a material on the housing walls interfers with the rotational movement of the paddles and increases the power required for rotating the impeller. The buildup of the gum-like material on the housing and paddles also decreases the throwing ability of the paddles. The material must be periodically removed from the interior of the housing which is a difficult and time consuming task. It is common practice to wash the inside of the impeller housing and impeller paddles with water to remove the material collected on the metal surfaces of the housing and impeller paddles. The machine must be shut down and manually serviced. A water hose must be hauled up into the tower silo so that the operator can flush out the machine to remove buildup of material from the operating parts thereof. The impeller housing and paddles of the invention have substantially reduced material collection problems and eliminated the need to wash the machine to maintain efficient operation. The power required to operate the silo unloader has also been reduced.

Silo Unloader impeller housings are fabricated sheet metal structures having material inlet and outlet openings. An impeller having pivoted paddles is located within the housing. An example of a one-piece silo unloader impeller housing is disclosed by F. E. Buschbom in U.S. Pat. No. 3,221,904 issued Dec. 7, 1965. This housing cannot be taken apart to service and clean the interior thereof. Silo unloader impeller housings have been made in two sections to aid in assembly of the housings. These housings have a top section having horizontal members secured to a bottom section generally along the horizontal plane of the axis of rotation of the impeller. Major parts of the silo unloader must be removed to take the housing apart. This is a substantial project and is not normally done to clean out the impeller housing and impeller therein. The impeller apparatus of the invention has overcome these disadvantages of the prior silo unloader impeller housings.

SUMMARY OF INVENTION

The invention broadly relates to a material handling apparatus for moving bulk material including particulate material to a selected location. The material handling apparatus has a housing surrounding a chamber having an inlet opening and an outlet opening spaced from the inlet opening. The housing includes a wall section having an inside surface extended between the inlet and outlet openings. A low friction and abrasion resistant member is located in surface engagement with the wall section to minimize collection of the material on the inside surfaces of the housing. The low friction and abrasion resistant member is removably retained on the housing so that it can be replaced with a new low friction and abrasion resistant member. The housing includes walls having grooves for accommodating opposite edge portions of the abrasion resistant member to hold the member on the wall section of the housing. The housing has a door which can be opened to provide access to the abrasion resistant member to facilitate its removal from and insertion into the housing. The member is a one-piece plastic liner of ultra high molecular weight and high density polymer. The material can be a polyethelene impregnated with abrasion resistant material, such as ceramics.

An impeller located within the chamber is operable to move material through the housing. The impeller has a plurality of paddle assemblies that have outer ends that move in close relationship to a knife mounted on the housing adjacent the inlet opening. The knife has a material cutting edge located in close relationship to the path of movement of the outer transverse edges of the paddle assemblies to cut material moved by the paddle assemblies as the material enters the housing. This minimizes the amount of material that can collect on the knife and reduces the power required to operate the silo unloader.

Each impeller paddle assembly has a liner of low friction and abrasion resistant plastic mounted on the leading sides of the body of the paddle assembly. The liner can be turned in end-to-end or removed from the paddle assembly and replaced with new liners. In one form of paddle assembly the body has a recess or pocket on the leading side thereof to accommodate the liner. A fastener, such as a nut and bolt assembly, holds the liner on the body. The body has a transverse lip at its outer end which extends to the outer face of the body and forms therewith a transverse edge that moves in close relation with respect to the knife edge to cut material.

The housing has a top cover that can be removed without disassembling the impeller or other parts of the machine. When the cover is removed the paddle assemblies can be serviced in a minimum time and effort. The cover has a forward lip and side walls that cooperate with holding flanges on the housing. Removable fasteners secure the cover to the housing.

DESCRIPTION OF DRAWING

FIG. 2 is a rear elevational view of the impeller assembly of FIG. 1;

FIG. 4 is an enlarged vertical sectional view of the back of the impeller housing showing the removable liner;

FIG. 5 is a sectional view taken along the line 5—5 of FIG. 4;

FIG. 6 is an enlarged sectional view taken along the lines 6—6 of FIG. 2;

FIG. 7 is a plan view of a liner apart from the impeller housing;

FIG. 8 is a side view of FIG. 7;

FIG. 9 is an end view of FIG. 7;

FIG. 10 is a sectional view taken along line 10—10 of FIG. 7;

DESCRIPTION OF PREFERRED EMBODIMENTS

Figure 1:
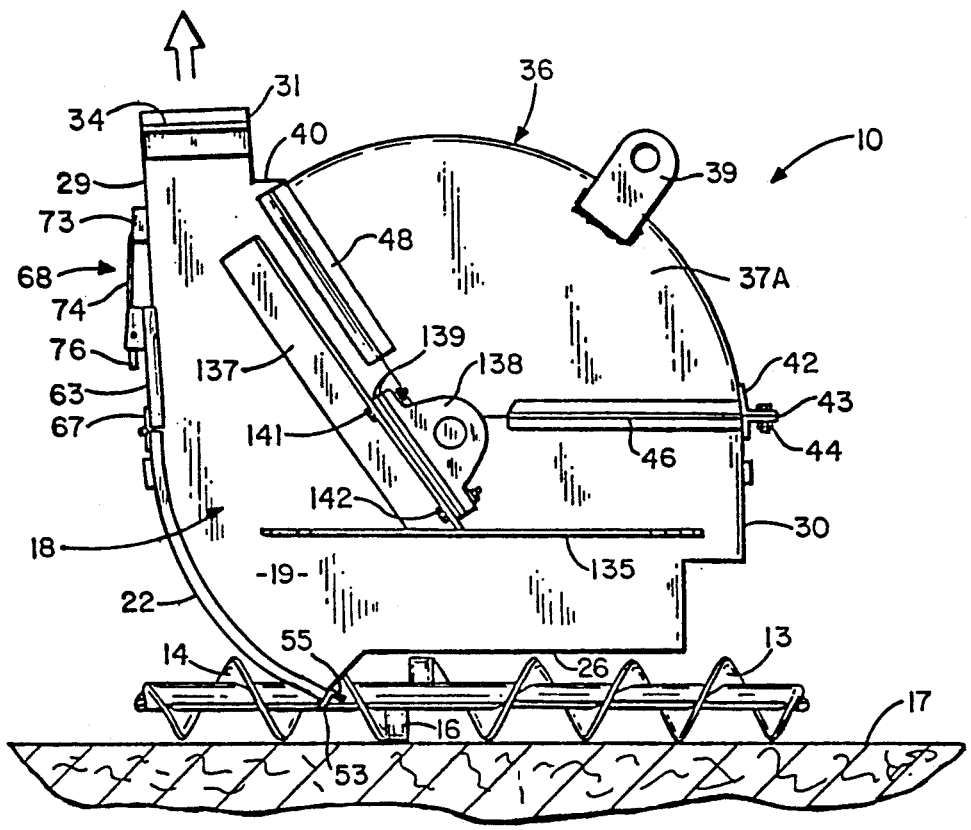
FIG. 1 is a fragmentary side elevational view of a silo unloader impeller assembly of the invention.
Figure 3:
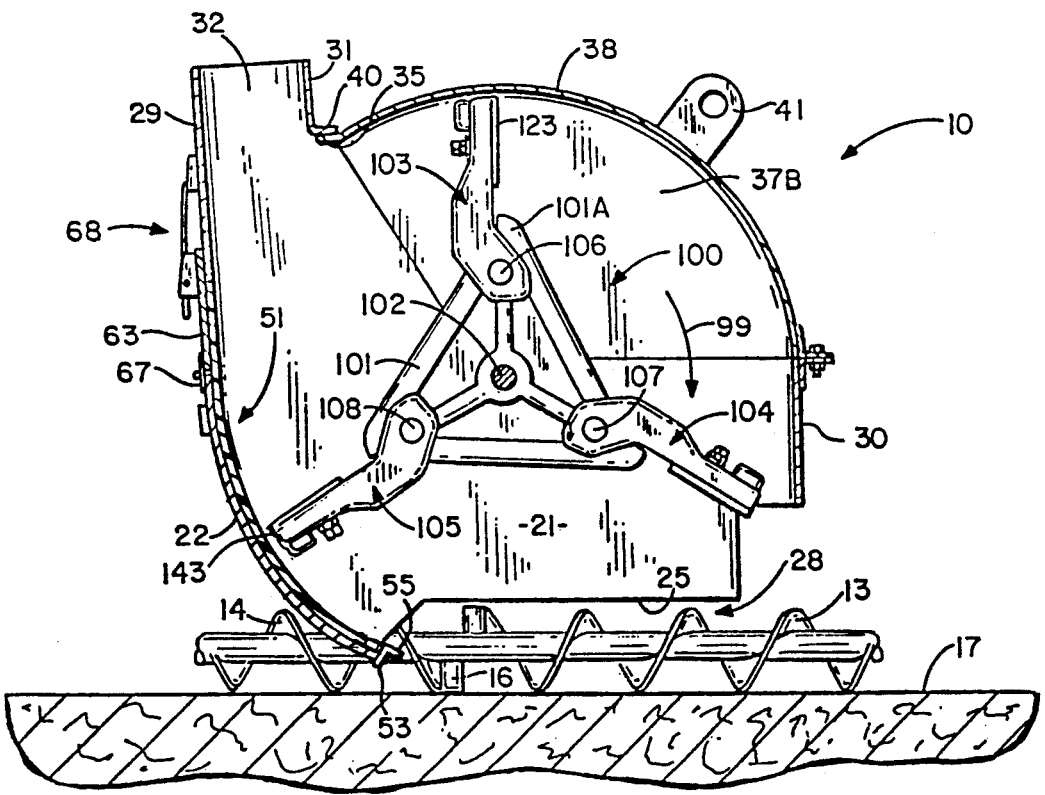
FIG. 3 is a sectional view taken along the line 3—3 of FIG. 2.
Figure 11:
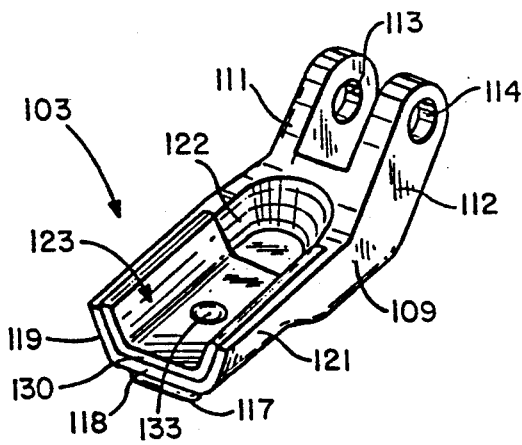
FIG. 11 is a perspective view of a paddle assembly of the impeller shown in FIG. 3.

Referring to FIGS. 1 and 3, the impeller assembly of the invention indicated generally at 10 is part of a top unloading silo unloader having material collectors or augers 13 operated to move material from the top surface 17 of the material in the silo toward impeller assembly 10. The leading auger 13 has a short reverse flight 14 operable to move the material to radial flipper blades 16 that kick the material into the inlet opening of impeller assembly 10. Impeller assembly 10 is herein described as incorporated into a top unloading silo unloader of the type disclosed by F. E. Buschbom in U.S. Pat. No. 3,232,456 issued Feb. 1, 1966. The invention incorporated in impeller assembly 10 is applicable to other agricultural, industrial, and residential equipment including but not limited to material and snow blowers, crop cutting machines, lawn mowers, scattering unloaders, beet toppers, pump and related equipment used to move liquids and particulate material to a selected location.

Impeller assembly 10 has a housing indicated generally at 18 comprising parallel flat side walls 19 and 21 secured to a convex curve rear wall 22. Rear wall 22 has side flanges 23 and 24 that extend over outer edge portions of side walls 19 and 21 and are secured thereto by welds or the like. Side wall 19 has a bottom edge 25 aligned with a bottom edge 26 on side wall 21 forming a bottom or material inlet opening 28. Located above rear wall 22 is an upright back wall 29 secured to side walls 19 and 21. A lower front wall 30 is secured to front edge portions of side walls 19 and 21 above the front end of material inlet opening 28. A top front wall 31 facing back wall 29 secured to side walls 19 and 21 forms an upright neck having an outlet or top opening 32. The neck is inclined upwardly and outwardly at a slight angle from the vertical of about 3 degrees to locate the collector augers 13 at a slight angle to automatically maintain an upward central cone shape of the top surface of the material in the silo. The neck can be maintained at other small angles to achieve the upward central cone shape of the top surface of the material in the silo.

The top front wall 31 is circumferentially spaced from the lower front wall 30 providing a top opening into the inside chamber of housing 18. This opening permits admittance to impeller 100 within housing 18 without taking the machine apart. Repairs and adjustment of impeller 100 and paddle assemblies 103, 104 and 105 can be made with minimum time and effort. The liners 123 and 223 can be removed from the paddle assemblies and replaced with new liners without removing them from the impeller.

A discharge chute (not shown) located above the neck directs the material from housing 18 toward a silo chute or other selected location. Angle members 33 and 34 secured to opposite sides of the neck are adapted to be attached to additional silo unloader structure such as a transition assembly providing an electrical connection to an electric motor (not shown) for driving the silo unloader.

The top opening of housing 18 is closed with a cover indicated generally at 36. Cover 36 can be removed from housing 18 to provide access to impeller 100 without disassembling the silo unloader. Cover 36 has parallel flat side walls 37A and 37B joined to a convex curved top wall 38. The pair of upwardly directed ears 39 and 41 having aligned holes at their outer ends are secured to side walls 37A and 37B and extend outwardly from top wall 38 are used to accommodate a pin so a cable hoist can be used to lift the entire silo unloader. The outer portion of top wall 38 has an angle member 42 that fits on top of a bracket 43 secured to lower front wall 30. A plurality of nut and bolt assemblies 44 releasably secure angle member 42 to bracket 43. The lower linear edges of side walls 37A and 37B are located adjacent side flanges 46 which form grooves 47 along walls 19 and 21 for the lower edges of side walls 37A and 37B. The lower edges of walls 37A and 37B of cover 36 lap over side walls 19 and 21 and fit into the grooves of flanges 46. Upwardly directed end flanges 48 extended from the center section of housing 18 toward upper front wall 31 have grooves 49 accommodating rear edges of walls 37A and 37B. The top of cover 36 has a rearwardly directed lip 35 that fits under a ledge or shoulder 40 secured to top front wall 31 whereby cover 36 is located on side walls 19 and 21 and engageable with front end walls 30 and 31 to enclose the top of housing 18. Cover 36 can be removed from housing 18 by removing nut and bolt assemblies 44 and the nuts thereon and lifting cover 36 from side walls 19 and 21 and moving lip 35 from ledge 40.

Referring to FIGS. 3, 4, and 5, an elongated arcuate liner, indicated generally at 51, of abrasion resistant plastic material having a low coefficient to friction is located in surface engagement with the inside surface of rear wall 22. Liner 51 is an elongated sheet member of bendable abrasion resistent plastic having a low coefficient of friction that promotes material flow and eliminates material build up in the housing. An example of a suitable abrasion resistant plastic material is an ultra high molecular weight and high density polymer. This material is highly abrasion and impact resistant which has minimum wear caused by sliding abrasion. The plastic is self lubricating with a very low coefficient of friction, and does not absorb moisture which reduces sticking and freezing of material on its surfaces. The plastic is resistant to moisture, acids and chemicals, and will not rust or corrode. The wear resisting features of the plastic is enhanced with impregnated abrasion resisting material or particles 72, such as ceramics and like materials, as shown in FIG. 10. An example of a suitable plastic is a polymer identified by the trademark TIVAR-88 available from Polytech Industries, Inc., Monticello, Ga. 31064.

As shown in FIGS. 7 to 10, liner 51 is a one-piece elongated, flat, rectangular sheet member having opposite transverse ends 52 and 54 and linear opposite parallel side edges 56 and 57. The side surfaces 69 and 71 are smooth and continuous. The sheet member has uniform thickness and is bendable in the transverse direction to form a broad arcuate shape. An example of liner 51 for a silo unloader impeller housing is a one-piece plastic sheet member having a uniform thickness of $\frac{1}{4}$ inch, a width of $5\frac{1}{4}$ inches, and a length of $20\frac{1}{4}$ inches. Liner 51 can have other sizes to fit into different shapes and sizes of impeller housing. The plastic material is a low friction and ultra high molecular weight polyethyene impregnated with ceramic particles.

Liner 51 as shown in FIG. 4 and 5, has lower transverse edge 52 bearing against a transverse plate 53 secured to the lower end of rear wall 22 across the inner end of the bottom inlet opening 28 of housing 18. Plate 53 is a right angle member having a portion projected inwardly from back wall 22 to provide a stop for the lower transverse edge 52 of liner 51. As shown in FIG. 4 and 5, plate 53 has a second knife portion 55 that projects downwardly and inwardly generally concentric with the axis of rotation of impeller 100. As shown in FIG. 3, liner 51 and back wall 22 have a radius of curvature that is greater than the outer path of impeller assemblies 103, 104 and 105 to permit free flow of material and air along liner 51. The minimum clearance of impeller assemblies 103, 104 and 105 with housing 18 is adjacent knife portion 55 to facilitate the cutting of the material. As shown in FIG. 5, knife portion 55 has a front V-shaped sharp edge. The edge converges at an angle of 30 degrees from a transverse line. Other angles can be used for the sharp edge of knife portion 55. The knife portion 55 reduces the amount of material that may collect on plate 53. The use of a flat plate without a knife across the lower end of back wall provides a material collection surface that accumulates material which creates resistance to the rotation of impeller 100. This increases the power needed to effectively rotate impeller 100. The knife portion 55 projects down over plate 53 and has a sharp edge that cuts material so that the material does not collect on plate 53. Thus, less power is needed to effectively operate the impeller 100.

Liner 51 extends upwardly from bar 53 along the inside surface of back wall 22 to a transverse edge 56 at the bottom of back wall 29. The transverse upper edge 54 of liner 51 is located adjacent edge 56 thereby positioning liner 51 along the inside of back wall 22. The liner 51 is bent into an arcuate shape with the back surface 71 in continuous surface contact with the inside face of back wall 22. Liner 51 is held in this position to prevent material from collecting behind liner 51 and changing the location of front surface 69. Surface 69 extends from bottom end 52 along an arc above the horizontal plane of the axis of rotation of impeller 100. The radius of this arc is greater than the radius of outer edges of impeller 100. Bolts, rivets, and pins are not used to secure liner 51 to back wall 22 as these fasteners do not prevent material from working behind liner 51 and do not maintain a smooth continuous arcuate outer surface on liner 51.

As seen in FIG. 6, the opposite side edges 56 and 57 of liner 51 are located in grooves or tracks 58 and 59 between the outer edges 61 of side wall 19 and back wall 22 and the outer edge 62 of side wall 21 and back wall 22. Edges 56 and 57 have a sliding tight fit in grooves 58 and 59 so that liner 51 self seals on back wall 22 preventing material from getting behind liner 51. Grooves 58 and 59 are arcuate tracks open to transverse bar 53 and extend upwardly therefrom along the curvature of rear wall 22 to a movable door indicated generally at 63 for retaining the upper end of liner 51 in alignment with back wall 29. Door 63 is a generally flat plate having upright side flanges 64 and 66 that telescope over the side edges of side walls 19 and 21. A hinge 67 secures the bottom of door 63 to the top of rear wall 22 whereby door 63 can be moved from a closed position, as shown in FIG. 1, to an open position to provide access to the upper end of liner 51 to enable the removal of liner 51 from housing 18. The upper end of liner 51 is moved outwardly away from the lower edge 56 of back wall 22. An upwardly directed pulling force is applied to liner 51 with the use of a gripping tool to slide liner 51 along grooves 58 and 59. Alternatively, a tool can be inserted between liner 51 and back wall 22 to force or pop out liner 51 from grooves 58 and 59. A new liner can be placed along rear wall 22 by sliding the new liner along grooves 58 and 59 until lower end 52 thereof engages the cross bar 53. The upper end of the new liner is then placed in alignment with the lower edge 56 of back wall 29. Door 63 is moved upwardly to its closed position. A latch 68 holds door 63 in a closed position. Latch 68 can be released so that door 63 can be pivoted downwardly to an open position.

Latch 68 has a catch member 73 connected to back wall 29 above door 63. A hook 74 pivoted to an over center lever 76 is mounted on door 63. Hook 74 engages catch member 73 to hold door 63 shut. Lever 76 is moved up to release hook 74 from catch member 73 so that door 63 can be moved to an open position. Other types of latches and releasable fasteners can be used to hold door 63 shut.

As shown in FIG. 3, impeller indicated generally at 100 located within the housing chamber has a central generally triangular hub or disc 101 secured to a power driven shaft 102. The three corners of disc 101 are pivotally connected to paddle assemblies 103, 104 and 105. Separate pins 106, 107, and 108 pivotally connect paddle assemblies 103, 104, and 105 to the three corner portions of disc 101 for limited swinging movement relative to disc 101. Disc 101 has radial abutments 101A at each corner that limit forward pivotal movement of the paddle assemblies 103, 104, and 105 during rotation of impeller 100 in the direction of arrow 99. The centrifugal forces acting on paddle assemblies 103, 104, and 105 pivot the paddle assemblies about pins 106, 107, and 108 in forward directions until they contact abutments 101A. The longitudinal planes of the leading faces of paddle assemblies 103, 104, and 105 are in general radial alignment with the axis of rotation of impeller 100. These planes are rearwardly of the radial lines passing through pivot pins 106, 107, and 108. The center of gravity of each paddle assembly is rearward of the center of rotation of the paddle assembly. This relationship between the center of gravity of the paddle assemblies substantially rigid in their radial positions even at relatively low rotational speeds. When relief of a paddle assembly is necessary, as when hard material enters the inlet opening of the housing, the paddle assembly will swing backward and ride over the hard material.

Paddle assemblies 103, 104, and 105 are identical in construction. The following description is limited to paddle assembly 103. As shown in FIGS. 7, 9, and 10, paddle assembly 103 has a generally trough shape throwing body 109 joined to upwardly and inwardly directed arms 111 and 112. Holes 113 and 114 in arms 111 and 112 accommodate pivot pin 106 mounted on disc 101 to allow paddle assembly 103 to swing on disc 101. Arms 111 and 112 are laterally spaced from each other to accommodate a corner portion of disc 101. Body 109 and arms 111 and 112 are a one-piece cast metal.

Figure 15:
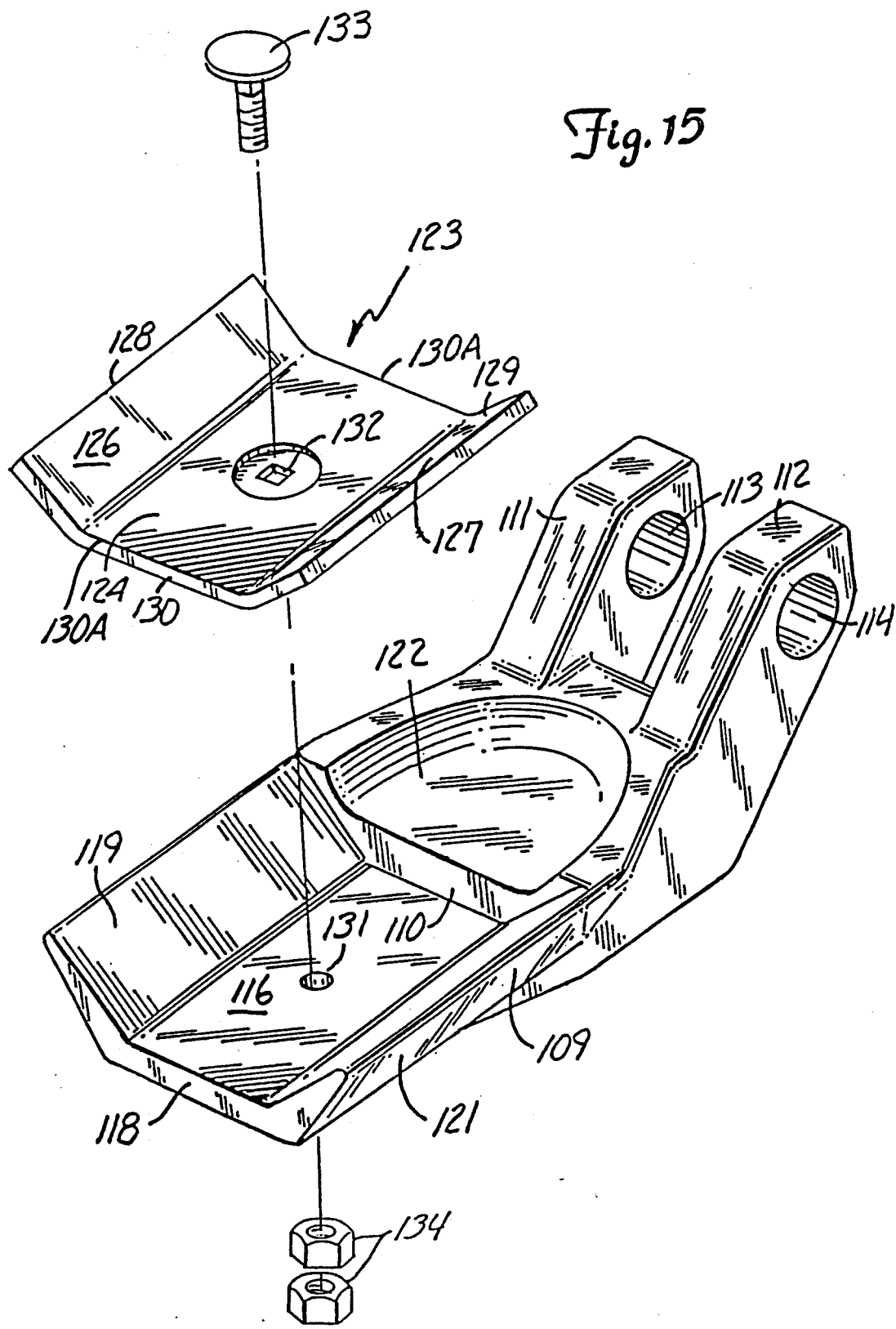
FIG. 15 is an exploded perspective view of the paddle assembly.

Body 109 has a longitudinal base 116 having a flat leading surface. A rear boss or rib 117 is on the trailing side of base 116 adjacent the outer end 118 thereof. Boss 117 is additional weight at the outer or tip end of paddle assembly 103. End 118 has a flat transverse surface that is parallel to the axis of rotation of paddle assembly 103 about pin 106. Side walls 119 and 121 joined to opposite sides of base 116 project forwardly and outwardly forming a generally U-shaped channel or recess 122 on the forward or leading side of body 109. Recess 122 has an inwardly stepped outer section as seen in FIG. 15 open to the outer end of base 116.

A shoe or liner, indicated generally at 123, preferably of ultra-high molecular weight polymer impregnated with abrasion resistant particles such as ceramics, is located in stepped section of recess 122 and secured to base 116 with bolt 133 accommodating nut 134. Liner 123 is a one-piece abrasion resistant plastic having a low coefficient of friction that promotes material flow and eliminates material build up on liner 123 thereby reducing maintenance time and labor. The plastic is an ultra high molecular weight and high density polymer, that has highly abrasion and impact resistant characteristics that reduce wear caused by sliding abrasion. The plastic is self lubricating and has a low coefficient of friction, and does not absorb moisture which reduces sticking and freezing of material on its surfaces. The plastic is resistant to moisture, acids, and chemicals and will not rust or corrode. An example of a suitable plastic is a polymer identified by the trademark TIVAR-88 available from Polytech Industries, Inc., Monticello, Ga. 31064.

Figure 12:
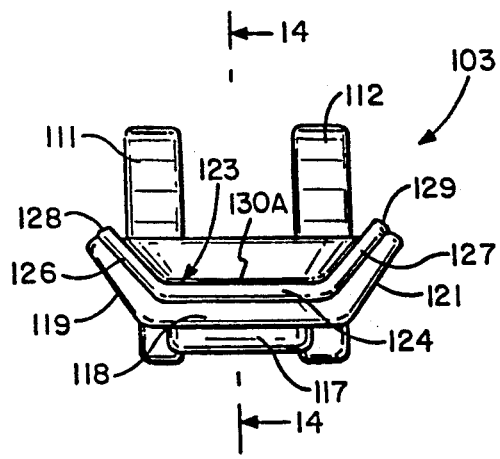
FIG. 12 is an enlarged outer end view of the paddle assembly of FIG. 11.
Figure 13:
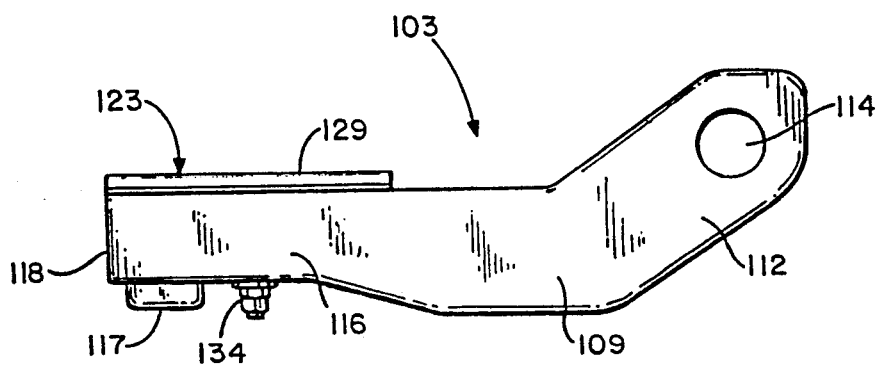
FIG. 13 is an enlarged side elevational view of the paddle assembly of FIG. 11.

Liner 123 has a generally flat bottom 124 located in surface engagement with the forward side of base 116. Upwardly and outwardly direct side flanges 126 and 127 are joined to bottom 124. Flanges 126 and 127, as seen in FIG. 12, have outer portions in tight surface engagement with the forward sides of side walls 119 and 121. Side flanges 126 and 127 have upper linear edges 128 and 129 that project above the top of the top edges of the side walls 119 and 121. Side flanges 126 and 127 being in tight contact with side walls 119 and 121 prevent material from working between liner 123 and body 109. Liner 123 has a flat outer transverse end 130 coextensive with the outer end 118 of body 109. End 130 has a channel shaped upper edge 130A that cooperates with the V-shaped edge of knife portion 55 on rotation of impeller 100 to cut the material moved toward knife portion 55 by the impeller. The coextensive end surfaces 118 and 130 are spaced inwardly from inner surfaces 69 of liner 51 during movement of paddle assembly 103 relative to liner 51. An increasing radial clearance between the arcuate section of inner liner surface 69 and the outer ends of paddle assemblies 103, 104 and 105 enhances the efficient impeller operation of the impeller. This radial distance can be adjusted to change the tip clearance as hereinafter described.

Figure 14:
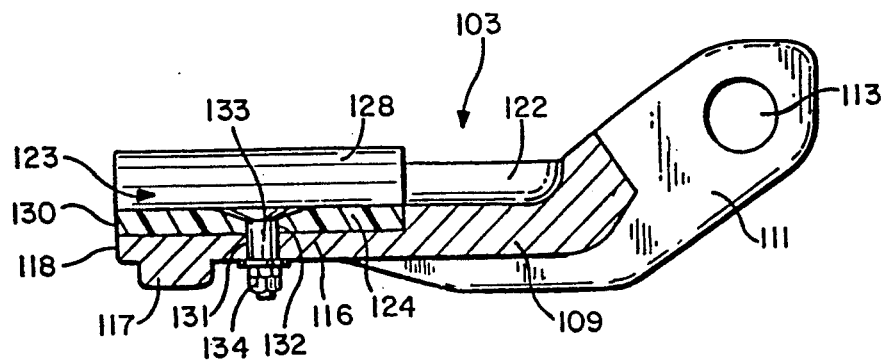
FIG. 14 is a sectional view taken along the line 14—14 of FIG. 12.

As seen in FIG. 14, bolt 133 extends through a hole 131 in body 109 and counter sunk hole 132 in liner 123. Bolt 133 is an elevator bolt having a large flat head engaging the center of the bottom 124 of liner 123. Two nuts 134 engage the outside surface of base 116 to retain the clamp force of bolt 133 on liner 123.

Liner 123 can be removed from body 109 by removing nuts 134 from bolt 133 and removing bolt 133 from body 109. A new liner can be placed into recess 122 and attached to body 116 by fastening bolt 133 to the new liner and body 109. Bolt 133 locates the inner transverse end 130A of liner 123 adjacent transverse shoulder 110 of body 109 thereby preventing liner 123 from turning on body 109. Liner 123 can be turned end-for-end so that end 130A is the outer end coextensive with end 118 of body 109. This increases the useful life of liner 123 as both ends 130 and 130A can be located at the outer end of body 109.

Figure 16:
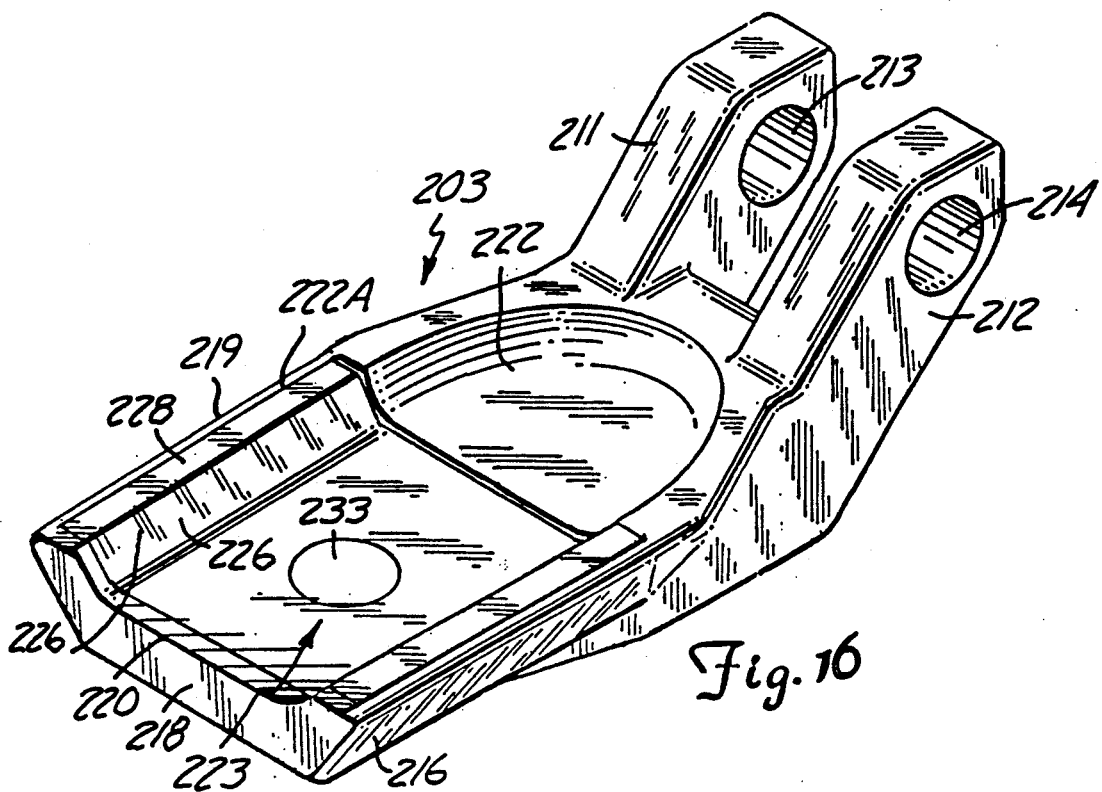
FIG. 16 is a perspective view of a modified paddle assembly usable with the impeller shown in FIG. 3.
Figure 17:
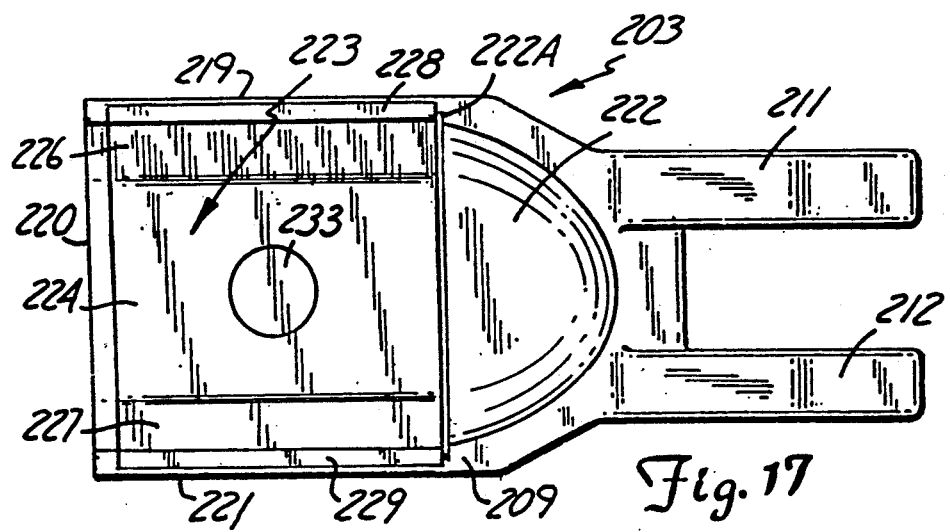
FIG. 17 is a top plan view of the paddle assembly of FIG. 16.
Figure 18:
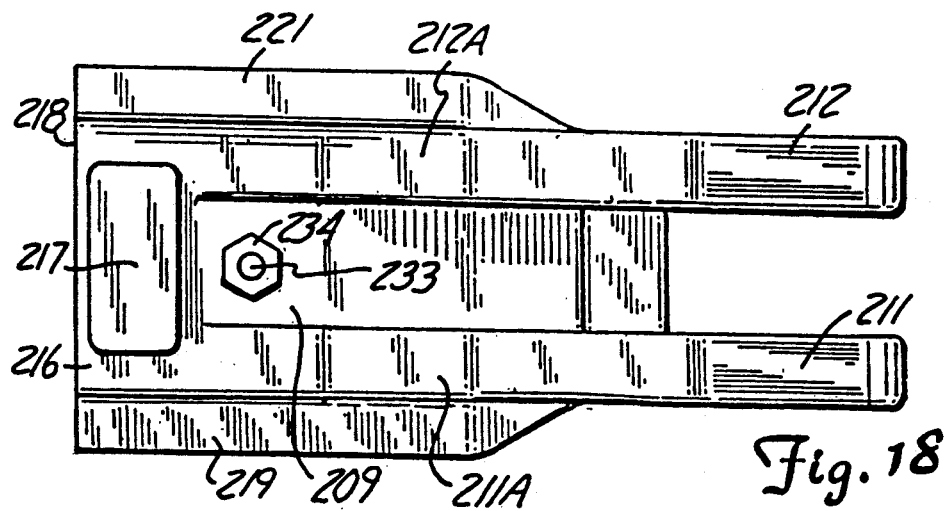
FIG. 18 is a bottom plan view of the paddle assembly of FIG. 16.
Figure 19:
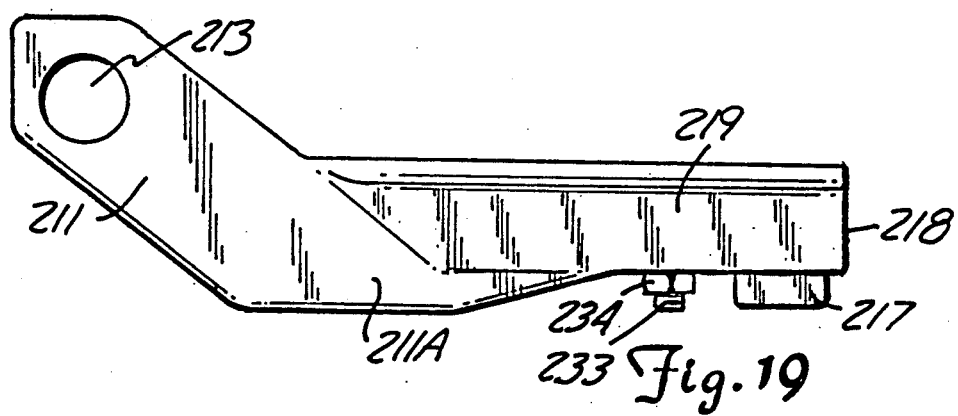
FIG. 19 is a side elevational view of the left side of the paddle assembly of FIG. 16.
Figures 20, 21:
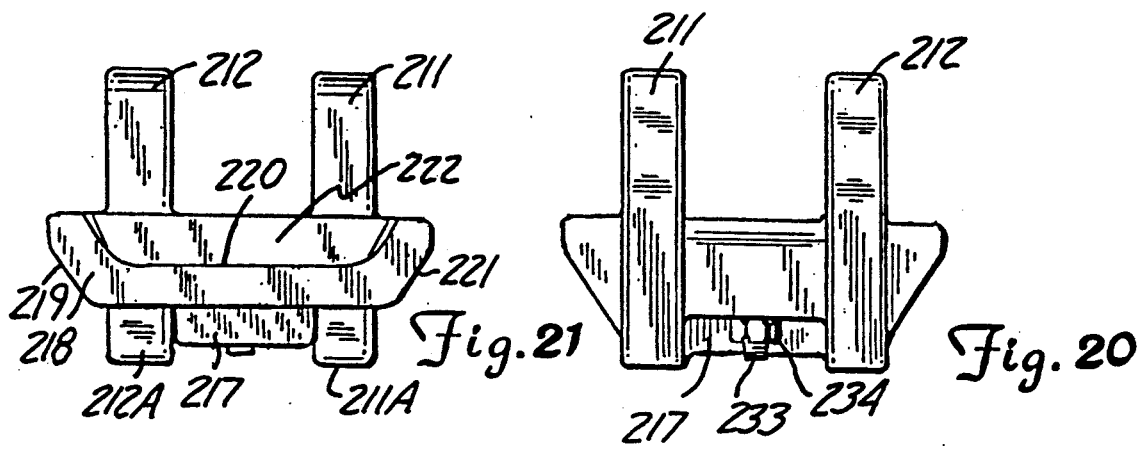
FIG. 20 is an end view of the inner end of the paddle assembly of FIG. 16.
FIG. 21 is an end view of the outer end of the paddle assembly of FIG. 16.

Referring to FIGS. 16–21, there is shown a modification of the paddle assembly indicated generally at 203. Paddle assembly 203 has a generally trough shaped thowing body 209 joined to upwardly directed and inwardly extended arms 211 and 212. The arms 211 and 212 have extensions or ribs 211A and 212A that are joined to the bottom of body 209. Arms 211 and 212 have aligned holes 213 and 214 to accommodate a pivot pin to mount a paddle assembly 203 on the impeller disc. As seen in FIGS. 17 and 18, arms 211 and 212 are laterally spaced from each other an equal distance from the center line of the paddle assembly to accommodate a corner portion of the impeller disc. The body 209 and arms 211 and 212 are one-piece cast metal.

Body 209 has a longitudinal base 216 supporting a rear boss or rib 217 adjacent the trailing side of the body adjacent the generally flat outer end 218 thereof. The upper portion of end 218 has a lip with transverse edge 220 that serves as a cutting edge in cooperation with the the V-shaped edge of knife section 55. Boss 217 provides additional weight along with the material of the lip having cutting edge 220 at the outer or tip end section of paddle assembly 203. End 218 has a flat transverse surface that is parallel to the axis of rotation of paddle assembly 203 and an upper horizontal surface that forms the transverse cutting edge 220. Upwardly and outwardly directed side walls 219 and 221 are joined to opposite sides of base 216 to form with the lip a generally U-shaped recess or pocket 222 on the forward or leading side of body 209. Pocket 222 has an inwardly stepped outer section 222A that accommodates a shoe or liner indicated generally at 223. Liner 223 is an ultra-high molecular weight polymer impregnated with abrasion resistent particles such as ceramics.

A bolt 223 having a flat circular head and a threaded stem accommodating a nut 234 is used to hold liner 223 on the body 209 within the pocket 222A. Liner 223 has a generally flat bottom 224 located in surface engagement with the forward side of base 216. Upwardly and outwardly directed side flanges 226 and 227 are joined opposite side of bottom 224 and engage the inside surfaces of the side walls 219 and 221 respectively. The flanges 226 and 227, as seen in FIGS. 16 and 17, have outer flat edges 228 and 229 that are flush with the top surfaces of the side walls 219 and 221. The side flanges 126 and 127 are located in tight contact with the side walls 219 and 221 to prevent the material from working between liner 223 and body 209.

Liner 223 is a one-piece abrasion resistent plastic having a low coefficient friction that promotes material flow and eliminates material buildup on liner 223 thereby reducing maintenance time and labor and power requirements of the impeller. The plastic is an ultra-high molecular weight and high density polymer that is highly abrasion and impact resistent thereby reducing wear caused by sliding abrasion of the materials handled by the impeller. The plastic is self-lubricating and has a low coefficient friction and does not absorb moisture which reduces sticking and freezing of material on its surface. The plastic is also resistent to moisture, acid, and chemicals and will not rust or corrode. An example of a suitable plastic is a polymer identified by the trademark TIVAR-88 available from Polytech Industries, Inc., Monticello, Ga. 31064.

Returning to FIG. 1, a generally horizontal rib 135 is secured to the mid portion of side wall 21 to longitudinally strengthen side wall 21. A similar horizontal rib 136 is secured to side wall 19. An upwardly and rearwardly inclined angle member 137 is secured to side wall 21 above rib 135. Angle member 137 extends generally normal to a radial line of back wall 22 that extends from the middle of the curved section of back wall 22 to the axis of rotation of impeller 100. A similar second angle member is secured to side wall 19. The angle members are supports for bearings 138 that rotatably accommodate shaft 102. A plurality of generally flat shims 139 are located between bearing 138 and angle members 137 supporting the bearings. Bolts 142 and 143 secure bearings 138 to angle members 137 and clamp shims 139 between bearings 138 and angle members 137. The number of shims can be selected to radially adjust gap 143, as shown in FIG. 3, between the outer or tip ends of the paddle assemblies 103, 104 and 105 and inner surface of knife section 55. The shims have open end slots that accommodate bolts 141 and 142 so that a selected number of shims can be removed or added to provide for the radial adjustment of impeller 100 within housing 18. The adjustment can be achieved without removing shaft 102 from bearings 138. A minimum of tolerance or gap between knife section 55 and the outer ends of the paddle assemblies 103, 104 and 105 as they rotate within the housing improves impeller and material cutting efficiency and prevents buildup and wrapping of material on the impeller assemblies. The impeller adjusting shims can be removed to permit bearings to be mounted directly on the angle supports 137 and 137A. The impeller 100 located within housing 18 can be made during assembly at the factory to ensure a close clearance between the outer ends of the paddle assemblies 103, 104 and 105 and the knife section 55.

While there have been shown and described, preferred embodiments of the impeller with a low friction and abrasion resistant liner and paddle assemblies with liners it is understood that changes in the structure, materials, and arrangement of structure can be made by those skilled in the art without departing from the invention. The invention is defined in the following claims.

I claim:

1. A material handling apparatus comprising: a housing having wall means surrounding a chamber having an inlet opening and an outlet opening spaced from the inlet opening, knife means mounted on the wall means adjacent the inlet opening, said knife means having an inwardly directed stop section and a knife portion that projects downwardly and inwardly, said knife portion having a cutting edge facing the inlet opening, a liner of low friction and abrasion resistant plastic means engageable with the stop section covering a portion of the inside of the housing to minimize collection of material within said housing, impeller means located within said chamber of the housing operable to move material through the outlet opening, said impeller means having paddle means to cut material on rotation of the impeller means, each paddle means has an outer generally transverse end having a generally transverse edge movable on rotation of the impeller means in close relation to the cutting edge of the knife means to cut material thereby reducing the amount of material that is collected on the wall means adjacent the inlet opening, and means rotatably mounting he impeller means on said housing, said knife portion located generally concentric with the axis of rotation of the impeller means whereby upon rotation of the impeller means material is cut by the cutting edge and moves from the inlet opening toward the outlet opening and is discharged through said outlet opening.

2. The apparatus of claim 1 wherein: the cutting edge of the knife means is generally V-shaped.

3. The apparatus of claim 1 wherein: said impeller means includes a disc, said paddle means comprising a plurality of paddle assemblies to the disc, each of said paddle assemblies, and pivot means connecting the paddle assemblies including a body having said outer end, said outer end having said transverse edge.

4. The apparatus of claim 3 wherein: each paddle assembly has arm means connecting the body to the pivot means and an outer end opposite the arm means.

5. The apparatus of claim 3 wherein: the body has a base and upwardly and outwardly directed side walls joined to the base.

6. A material apparatus comprising: a housing having wall means surrounding a chamber having an inlet opening and an outlet opening spaced from the inlet opening, said wall means having a wall section having an inside surface extended between the inlet opening and outlet opening, said wall section having a lower end adjacent said inlet opening, knife means secured to the lower end of said wall section, said knife means having a knife portion extended downwardly and inwardly, said knife portion having cutting edge facing the inlet opening, means located in engagement with at least a portion of the inside surface of said wall section to minimize collection of material on said wall section, said means comprising low friction and abrasion resistant plastic means covering a portion of the inside surface of the wall section extending from the knife means toward the outlet opening, means for holding said plastic means on the wall section and allowing the plastic means to be removed form the housing, impeller means located within said chamber of the housing operable to move material from the inlet opening and discharge the material through the outlet opening, said impeller means having paddle means including outer peripheral edges moveable in close relation to said cutting edge of the knife means to cut material on rotation of the impeller means, thereby reducing the amount of material that is collected on the lower end of the wall means and means rotatably mounting the impeller means on said housing, said knife portion located generally concentric with the axis of rotation of the impeller means whereby upon rotation of said impeller means material moves from the inlet opening along said plastic means toward the outlet opening and is discharged through said outlet opening.

7. The apparatus of claim 6 wherein: said impeller means includes a disc, said paddle means comprising a plurality of paddle assemblies, and pivot means connecting the paddle assemblies to the disc, each of said paddle assemblies including a body having said outer end and a recess on leading side thereof, a liner of low friction material located in said recess, and means securing the liner to said body.

8. The apparatus of claim 7 wherein: the body has a base and upwardly and outwardly directed side walls joined to the base.

9. The apparatus of claim 7 wherein: the cutting edge of the knife means is generally V-shaped.

10. The apparatus of claim 6 wherein: the knife means has an inwardly directed stop section, and said plastic means comprising a liner of low friction and abrasion resistant plastic engagable with the stop section covering a portion of the inside of the housing to minimize collection of material within said housing.

11. The apparatus of claim 6 wherein: the cutting edge of the knife means is generally V-shaped.

12. A material handling apparatus comprising: a housing having wall means surrounding a chamber having an inlet opening and an outlet opening spaced from the inlet opening, said wall means having a back wall having an inside concave surface extended between the inlet opening and outlet opening and side walls joined to the back wall forming a passage for material moving from the inlet opening to the outlet opening, said wall means having a lower end adjacent said inlet opening, knife means secured to the lower end of said wall means, said knife means having an inwardly directed stop section and a knife portion that projects downwardly and inwardly, said knife portion having a cutting edge facing the inlet opening, a liner of low friction and abrasion resistant plastic means engageable with the stop section covering a portion of said back wall to minimize collection of material on said wall means, impeller means located within said chamber of the housing operable to move material from the inlet opening and discharge the material through the outlet opening, said impeller means having paddle means including the outer peripheral edges movable in close relation to said cutting edge of the knife means to cut material on rotation of the impeller means thereby reducing the amount of material that is collected on the lower end of the wall means, and means rotatably mounting the impeller means on said housing, said knife portion located generally concentric with the axis of rotation of the impeller means whereby upon rotation said impeller means material moves along said passage from the inlet opening toward the outlet opening and is discharged through said outlet opening.

13. The apparatus of claim 12 wherein: said impeller means includes a disc, said paddle means comprising a plurality of paddle assemblies, and pivot means connecting the paddle assemblies to the disc, each of said paddle assemblies including a body having a transverse recess on leading side thereof, a liner of low friction material located in the said recess, and means securing the liner to said body.

14. The apparatus of claim 12 wherein: the cutting edge of the knife means is generally V-shaped.

15. The apparatus of claim 12 wherein: each paddle means has a generally transverse outer end having a generally transverse edge movable on rotation of the impeller means in close relation to the cutting edge of the knife means to cut material.

16. The apparatus of claim 12 wherein: said knife means has a knife portion that projects downwardly and inwardly generally concentric with the axis of rotation of the impeller means.

17. The apparatus of claim 19 wherein: the cutting edge of the knife means is generally V-shaped.

* * * * *